Oct. 30, 1923.
H. J. CASE
1,472,429
CORN HARVESTER AND BINDER
Filed Jan. 15, 1920     10 Sheets-Sheet 1
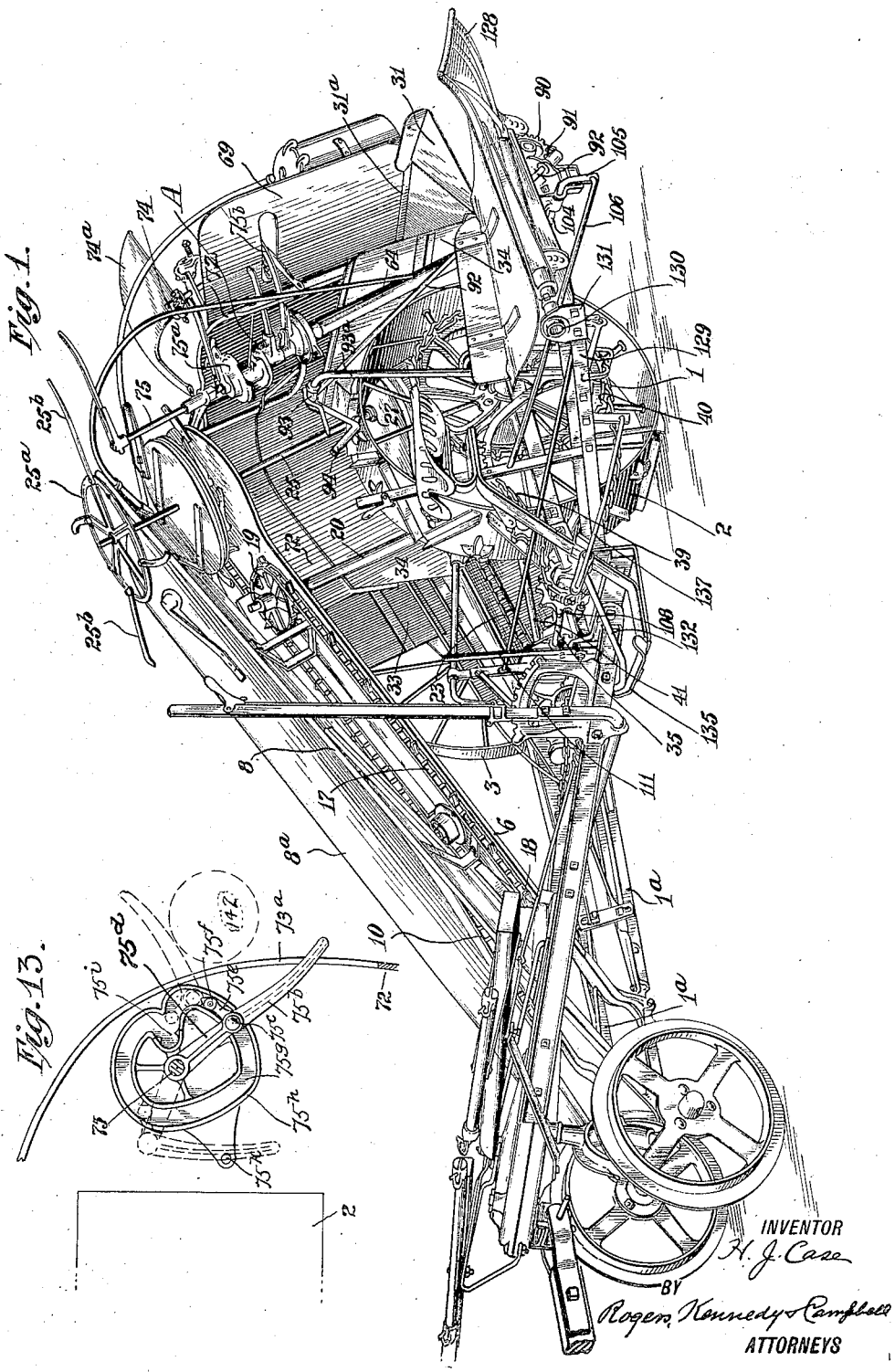
INVENTOR
H. J. Case
BY
Rogers, Kennedy & Campbell
ATTORNEYS

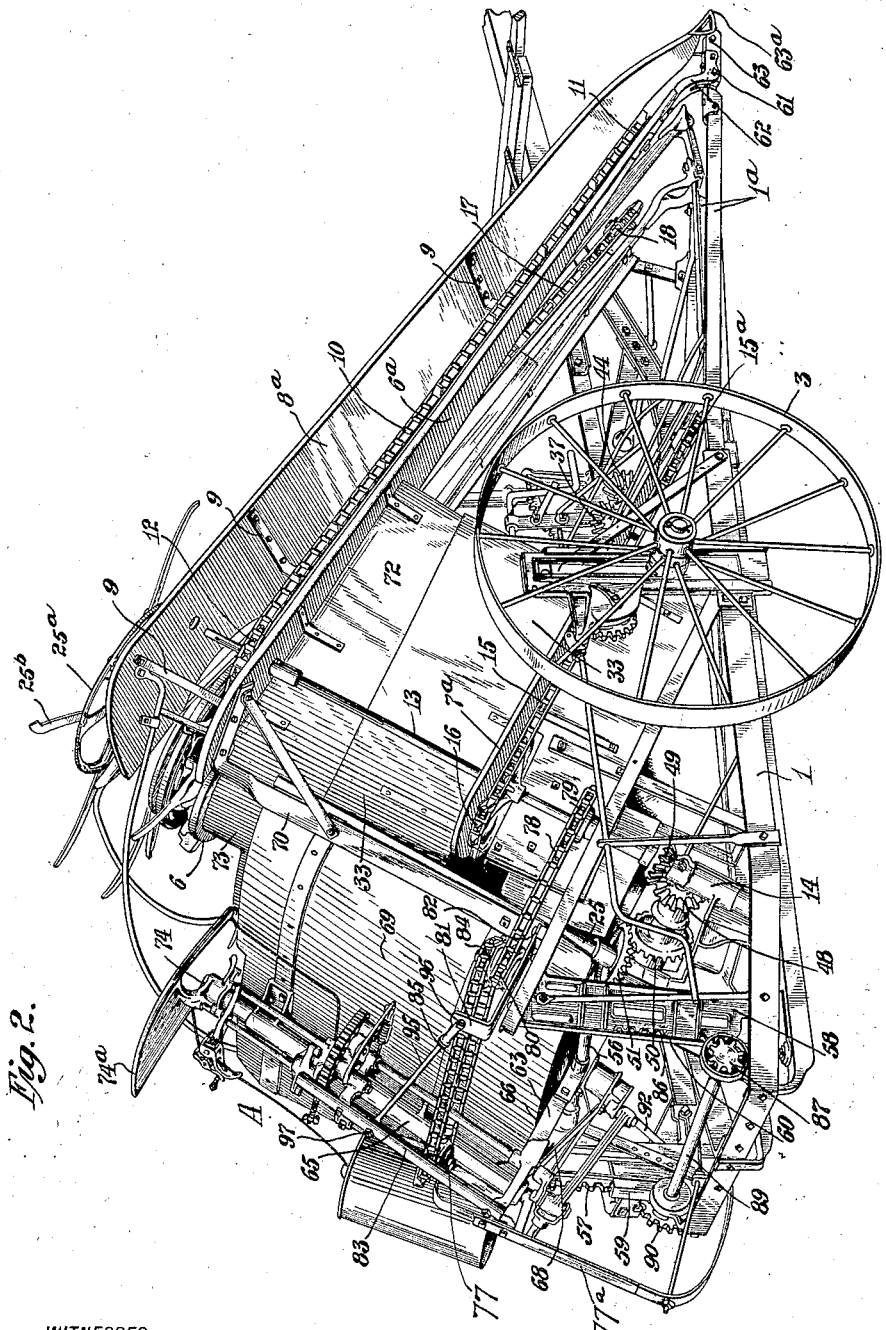

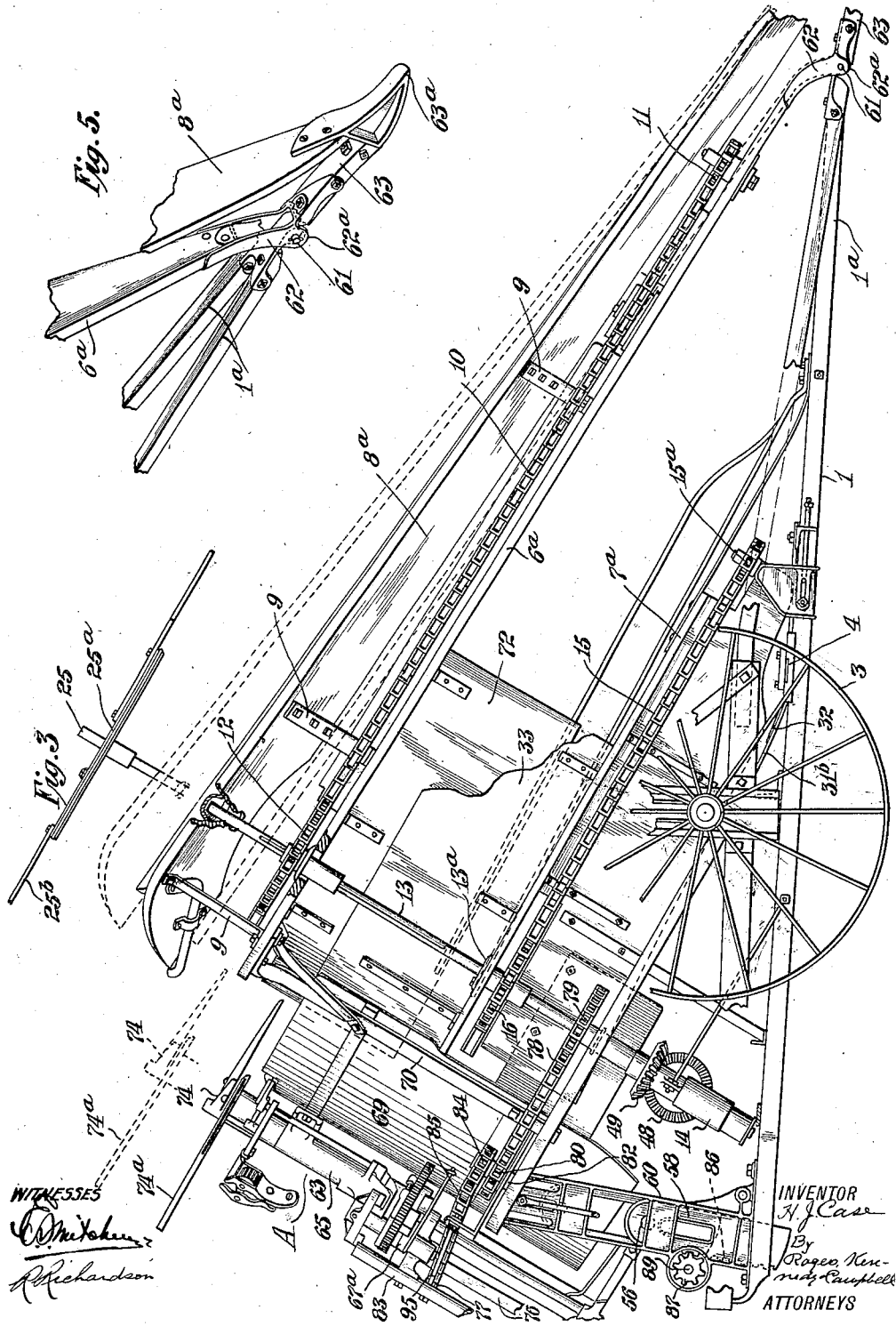

Oct. 30, 1923.
H. J. CASE
1,472,429
CORN HARVESTER AND BINDER
Filed Jan. 15, 1920   10 Sheets-Sheet 4
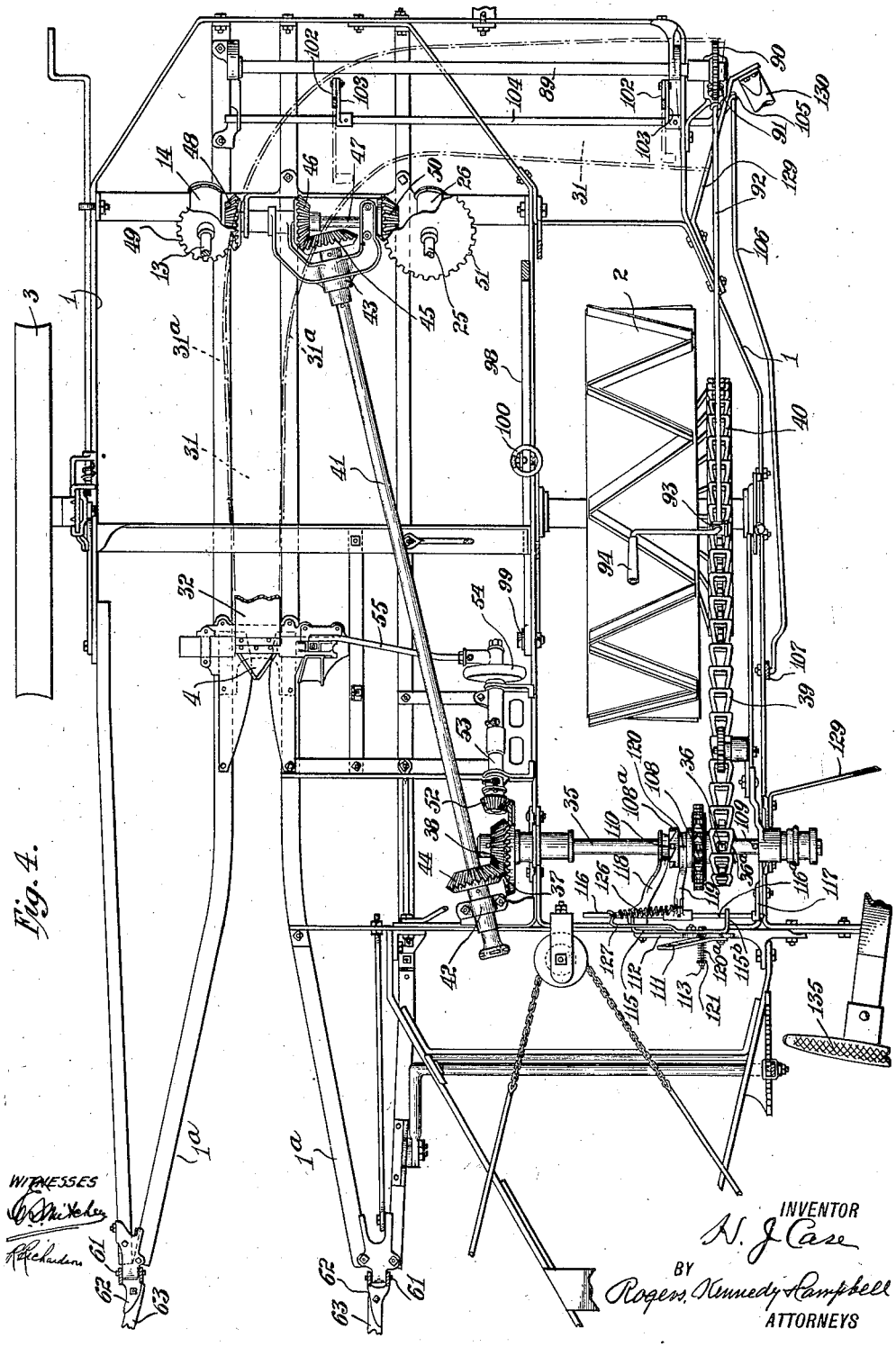

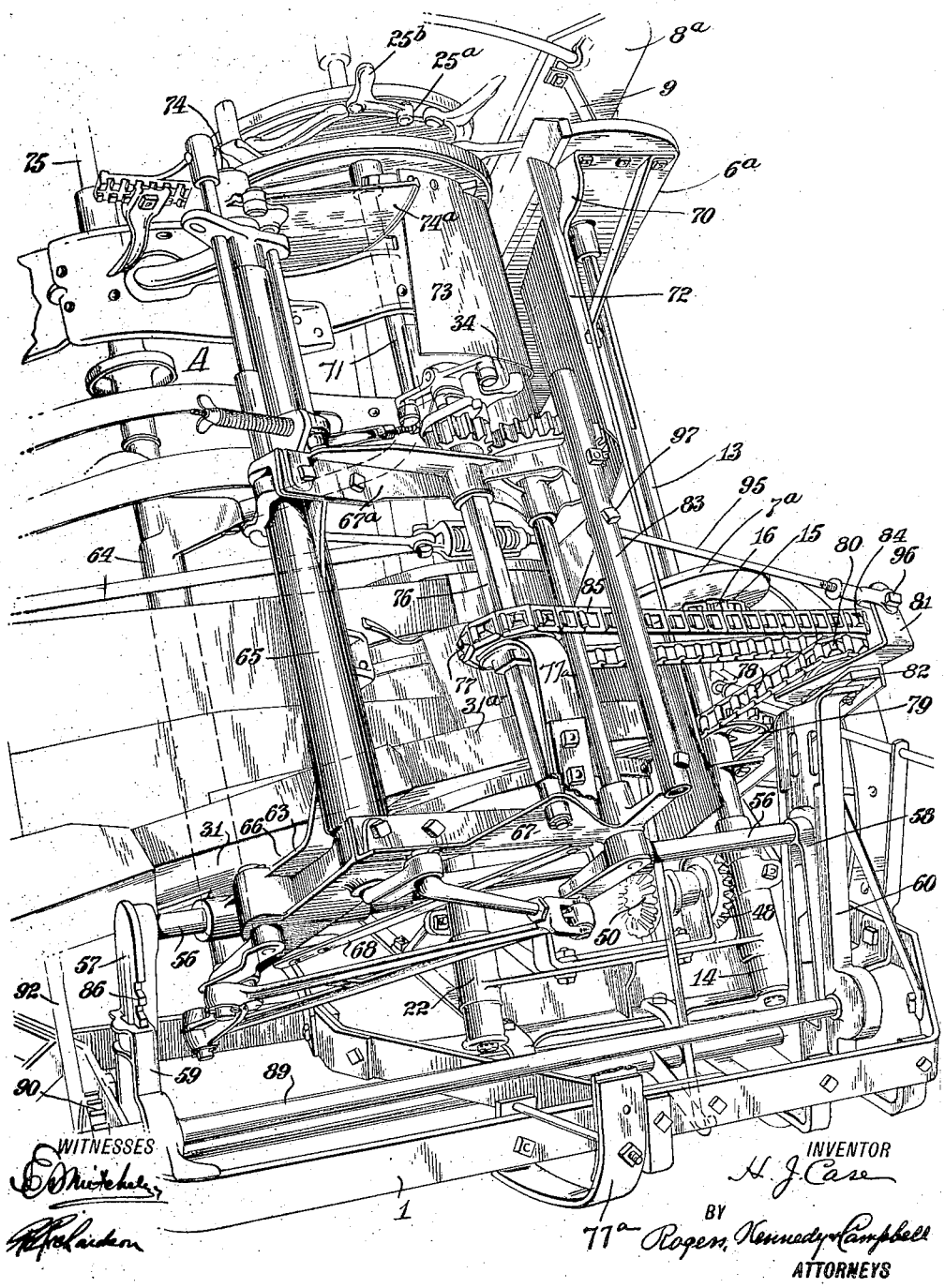

Oct. 30, 1923.
H. J. CASE
1,472,429
CORN HARVESTER AND BINDER
Filed Jan. 15, 1920    10 Sheets-Sheet 6
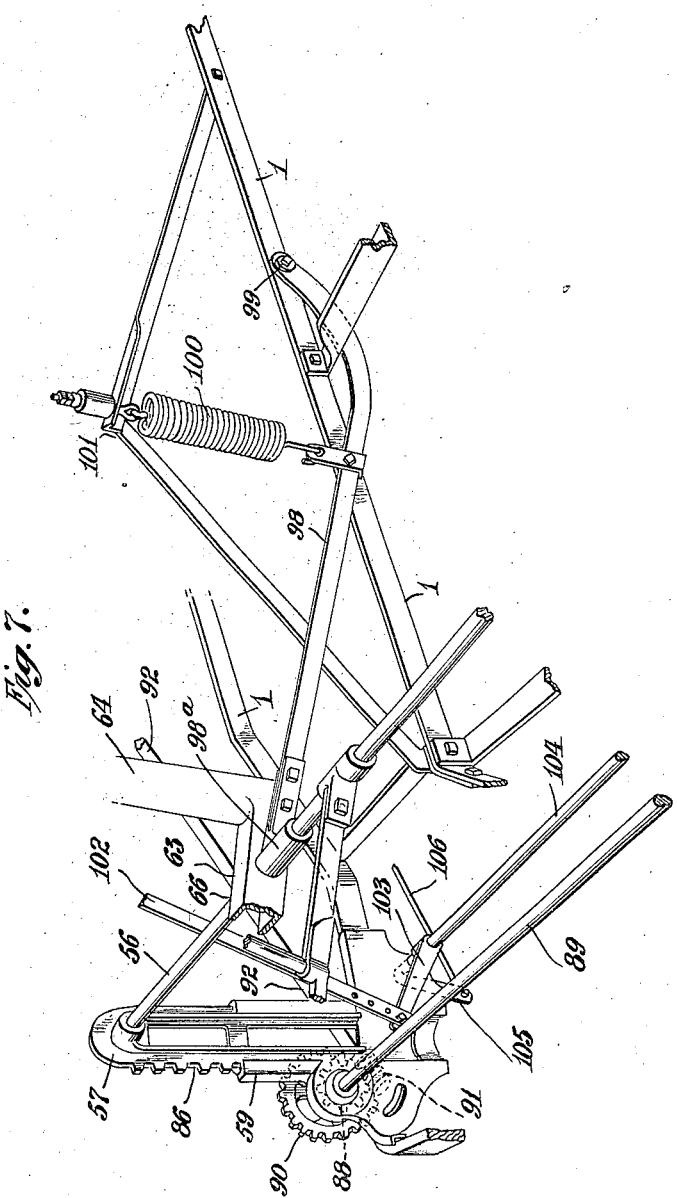

Oct. 30, 1923.
H. J. CASE
CORN HARVESTER AND BINDER
Filed Jan. 15, 1920 10 Sheets-Sheet 7
1,472,429
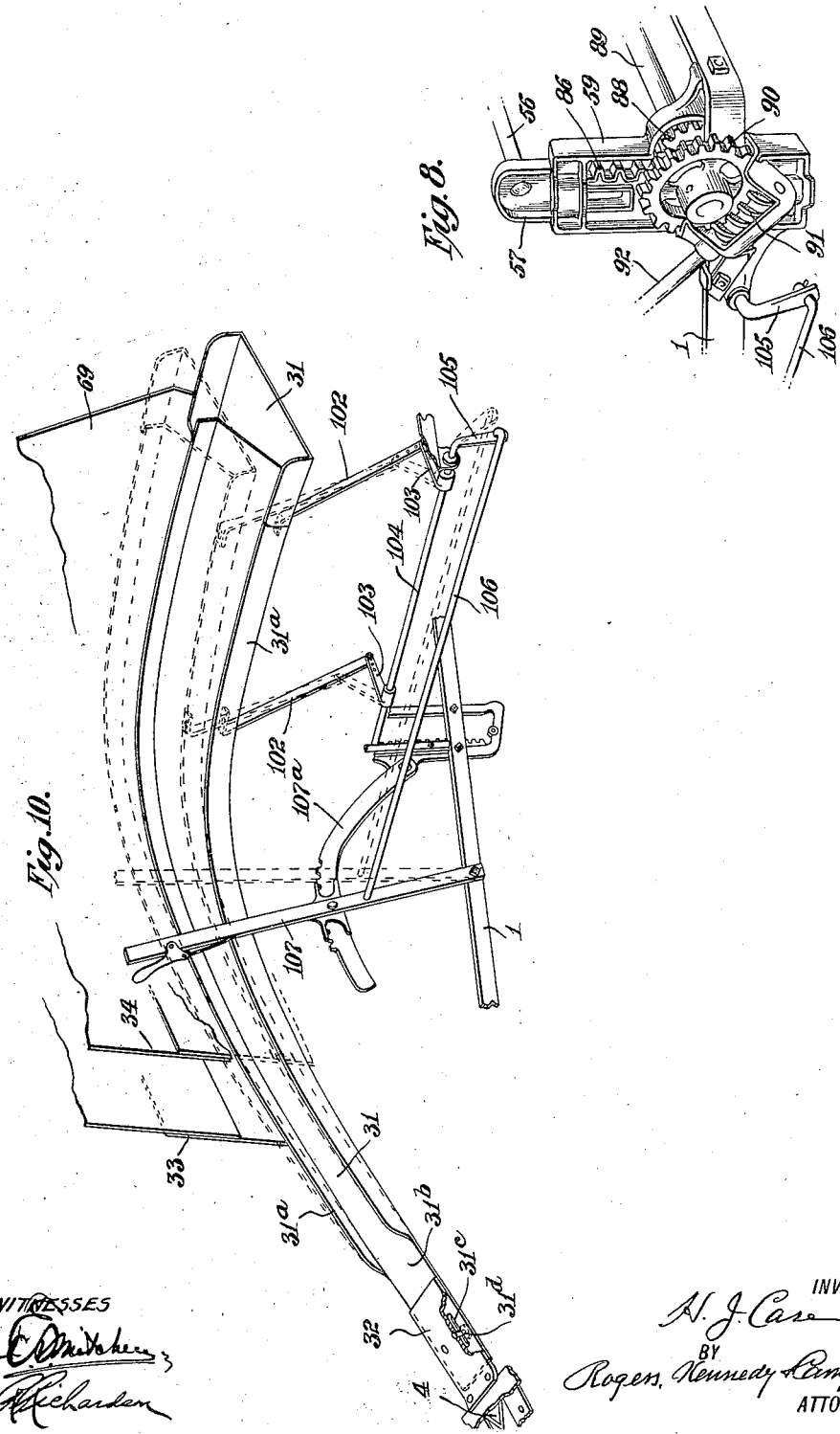

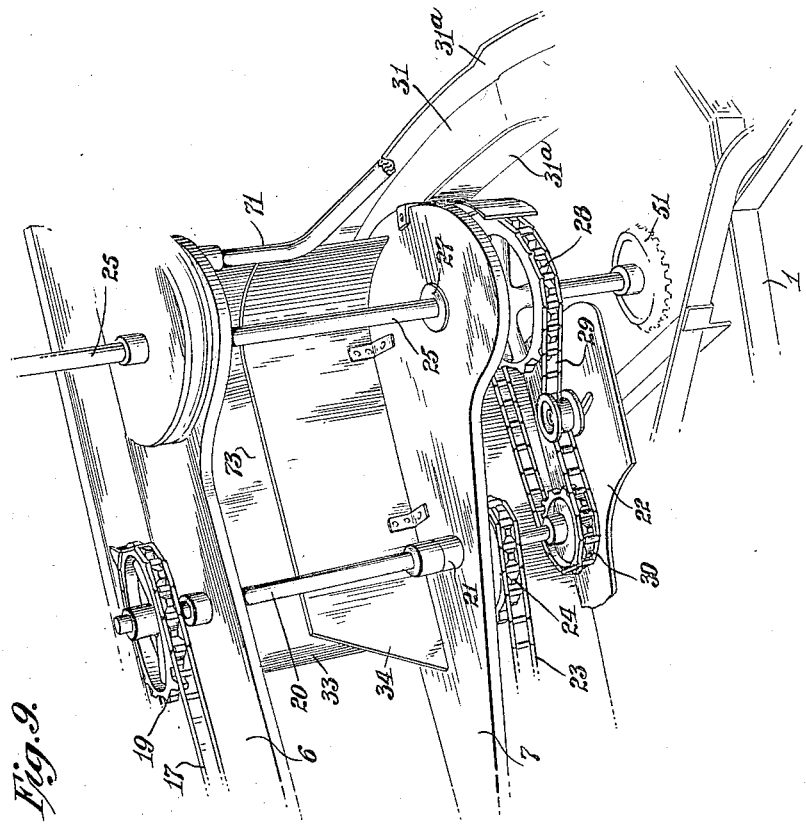

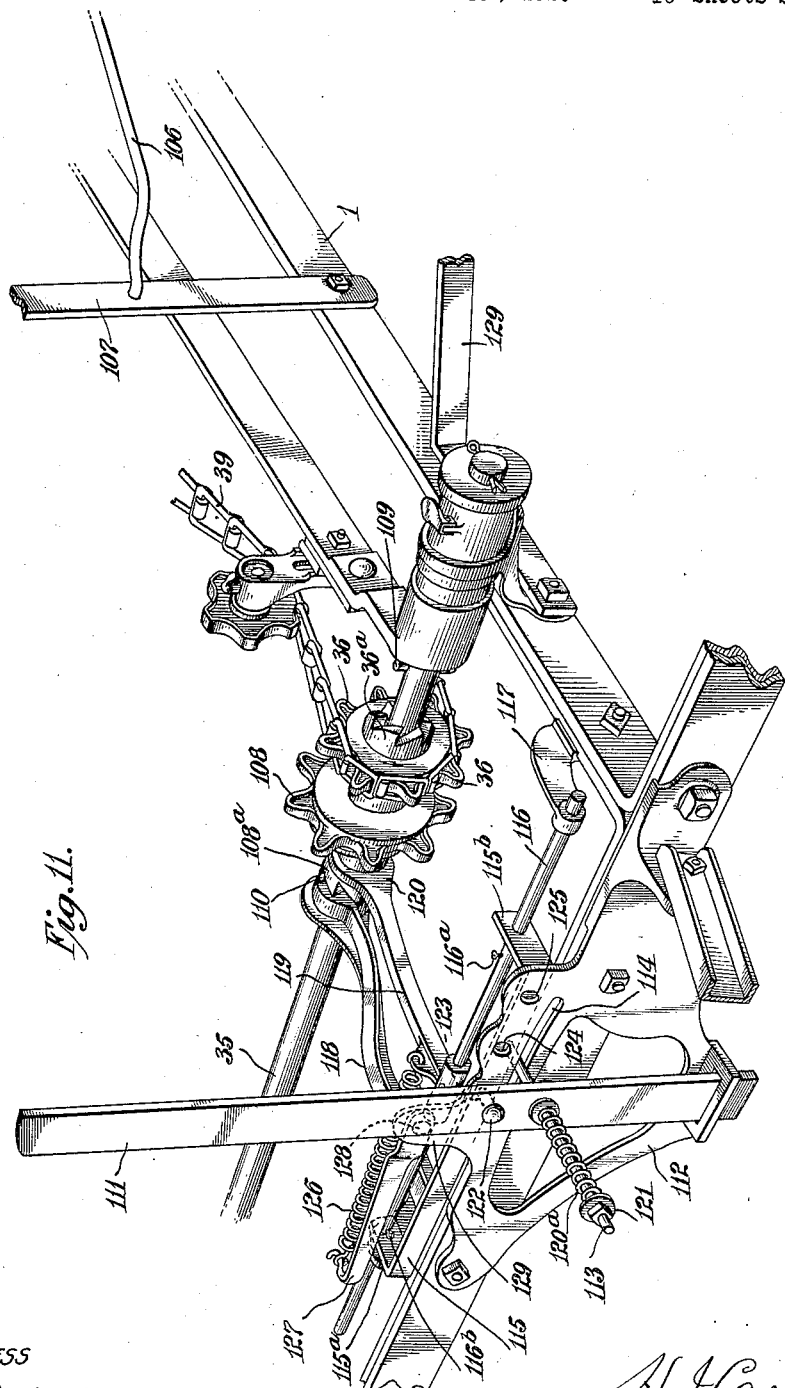

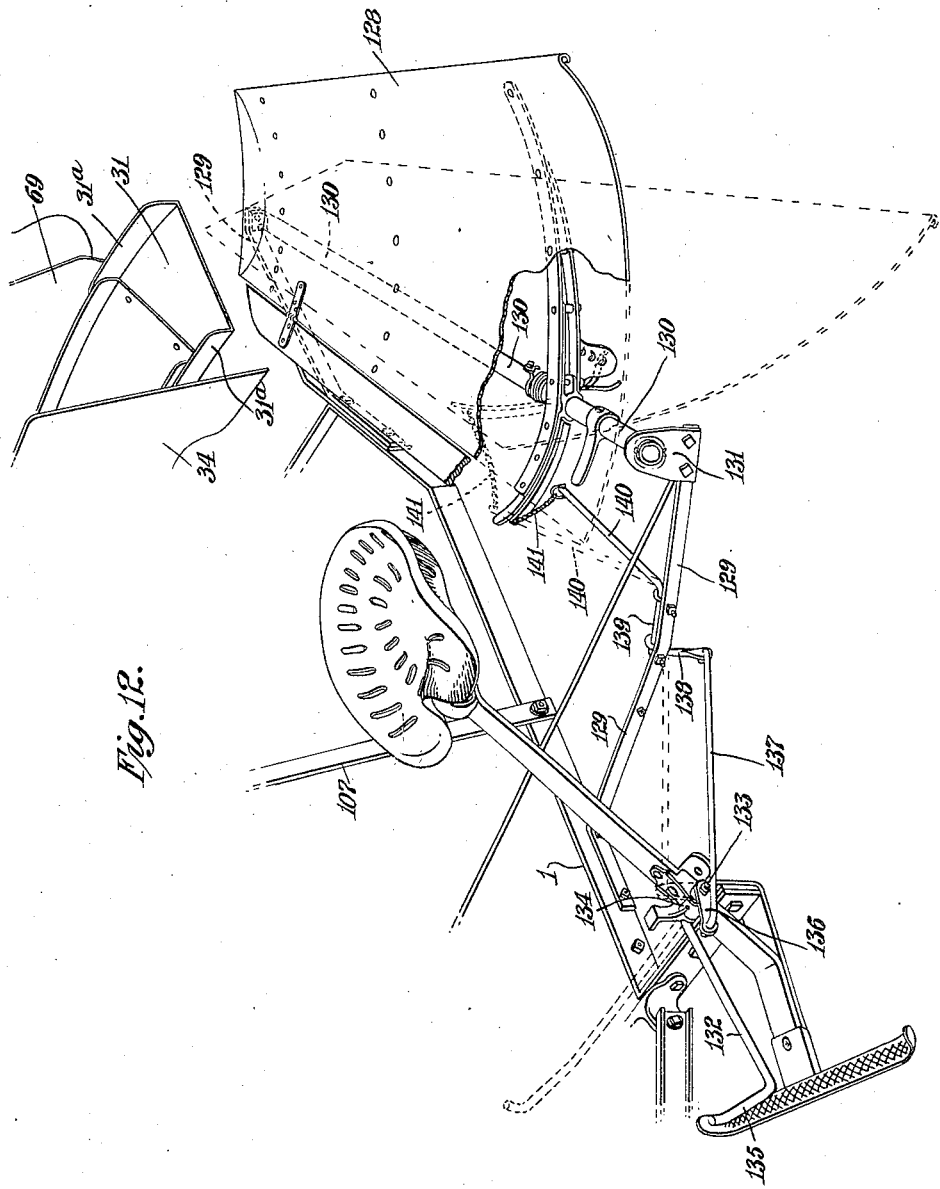

Patented Oct. 30, 1923.

1,472,429

UNITED STATES PATENT OFFICE.

HENRY J. CASE, OF POUGHKEEPSIE, NEW YORK, ASSIGNOR, BY MESNE ASSIGNMENTS, TO MOLINE PLOW COMPANY, INCORPORATED, OF MOLINE, ILLINOIS, A CORPORATION OF VIRGINIA.

CORN HARVESTER AND BINDER.

Application filed January 15, 1920. Serial No. 351,673.

*To all whom it may concern:*

Be it known that I, HENRY J. CASE, a citizen of the United States, residing at Poughkeepsie, in the county of Dutchess and State of New York, have invented certain new and useful Improvements in Corn Harvesters and Binders, of which the following is a specification, reference being had therein to the accompanying drawing.

This invention relates to machines for harvesting and binding corn, in which the cut stalks are conveyed in an upright position through a stalk passage or chute to the rear end of the machine and there bound into bundles by an automatic binding mechanism sustained by the machine, and the bound bundles finally delivered from the machine.

The object of the invention is to insure that the bundles of stalks be bound at the proper point in their length without regard to variations in the length of the stalks, and to this end the invention consists of means of improved form and construction for adjusting the binding mechanism as a whole in the direction of the length of the stalks, so that the binding mechanism may be caused to apply the binding twine to the bundle at the proper point therein, although the stalks operated on may be longer or shorter in different cases.

The invention consists also in combination with means for adjusting the binding mechanism lengthwise of the stalks, of independent means for adjusting the bottom of the stalk passage in a corresponding direction, so that by the combined operations of these two adjustments, stalks greatly varying in length may be handled with the minimum amount of adjustment of the comparatively heavy and cumbersome binding mechanism.

The invention consists also in various improvements in the machine as a whole, designed to render the same strong and durable in construction and effective and reliable in operation.

In the accompanying drawings:

Fig. 1 is a front perspective view from its stubble side, of a corn harvesting and binding machine having my invention embodied therein;

Fig. 2 is a rear perspective view of the same from the grain side;

Fig. 3 is a side elevation of the machine from the grain side;

Fig. 4 is a horizontal sectional plan view, showing the main frame of the machine and certain parts directly supported therefrom;

Fig. 5 is a fragmentary perspective view of a detail showing how the upper conveyor boards and their associated divider boards are connected at their forward extremities with the machine frame;

Fig. 6 is a perspective view of the rear portion of the machine;

Fig. 7 is a fragmentary perspective view of the mechanism for adjusting and counterbalancing the binding mechanism;

Fig. 8 is a perspective view of a detail of the same;

Fig. 9 is a fragmentary perspective view of the rear ends of the upper and lower conveyor boards showing how the upper and lower conveyor chains are driven on the stubble side of the machine;

Fig. 10 is a perspective view of the adjustable bottom of the stalk chute or passage and the means for adjusting the same;

Fig. 11 is a perspective view of a change-speed device for the operating mechanism of the machine;

Fig. 12 is a perspective view on an enlarged scale of a bundle carrier and the adjacent portions of the machine; and Figure 13 is a partial sectional plan view showing the detailed form of the ejector and the cam for operating the same.

Referring to the drawings:

The operative parts of the machine are mounted on and sustained by a main frame 1 supported on the stubble side by the usual bull or stubble wheel 2 and supported on the grain side by the grain wheel 3. The frame consists as usual of longitudinally extending frame bars, and front, rear and intermediate transversely extending frame bars, which bars are connected together to form a unitary frame structure, at the grain side of which the longitudinal bars are continued forwardly in the form of diverging extensions 1$^a$ thereby forming a passage in which the standing stalks are received as the machine advances. At the rear end of this passage is located a cutting mechanism 4 operated as presently described and acting to sever the standing stalks.

Arranged at the opposite sides of this passage and extending rearwardly to the rear portion of the frame are upper and lower conveyor boards 6 and 7 on the stubble side and upper and lower boards 6ª and 7ª on the grain side. The lower conveyor boards are fastened to the main frame and extend from a point some distance in rear of the front ends of the diverging extensions 1ª rearwardly at an upward inclination as shown in Fig. 3, while the upper boards are arranged some distance above the lower ones and extend at a similar inclination rearwardly and upwardly from the forward ends of the extensions 1ª, divider boards 8 and 8ª being sustained over the respective boards 6 and 6ª in fixed relation to the same by means of standards or braces 9.

An upper endless conveyor chain 10 extends longitudinally of the conveyor board 6ª and passes at its front around an idler sprocket wheel 11 on said board and at its rear around a driving sprocket wheel 12 splined to a forwardly inclined shaft 13, the lower end of the shaft being mounted in a bearing 14 sustained by the main frame and the shaft extending upwardly through the lower and upper conveyor boards 7ª and 6ª and being mounted in a bearing 13ª on the lower board. This chain is provided as usual with conveyor teeth which project into the upper portion of the space between the opposing conveyor boards. A similar lower conveyor chain 15 is arranged beneath the lower conveyor board 7ª, and passes at its front around an idler sprocket wheel 15ª mounted on the frame near the front end of the board 7ª and at its rear around a sprocket wheel 16 keyed to the shaft 13 below the board 7ª, the teeth on this chain projecting into the lower portion of the space between the opposing conveyor boards. Opposing the conveyor chain 10 and arranged on the upper conveyor board 6 is a conveyor chain 17 (see Figs. 1 and 9) which passes at its front around an idler sprocket wheel 18 on the front end of the board 6 and at its rear end around a sprocket wheel 19 splined to the upper portion of a forwardly inclined counter-shaft 20 extending downwardly loosely through the board 6 and through the lower board 7 in which latter it has a bearing 21. The lower end of this shaft is mounted in a bearing in a bracket plate 22 fixed to the main frame. This sprocket chain 17 like the opposing chain 10 is provided with conveyor teeth projecting into the upper portion of the space between the conveyor boards, and co-operates with the teeth on chain 10 in acting on the stalks and conveying them towards the rear. Opposing the lower chain 15 is a conveyor chain 23 which is arranged beneath the lower board 7 and which passes at its front around an idler sprocket wheel on the frame near the front end of the board 7, and at its rear end around a sprocket wheel 24 keyed to the shaft 20 beneath the board 7, the teeth on this chain projecting into the lower portion of the space between the conveyor boards and co-operating with the teeth on the chain 15 in conveying the stalks rearwardly. The idler sprocket wheel mentioned above has not been shown as it is similar to the idler sprocket wheel 15ª.

The counter-shaft 20 is driven from an upright forwardly inclined shaft 25 whose lower end is mounted in a bearing 26 whence the shaft extends upwardly through a bearing 27 in the rear end of the lower conveyor board 7, and loosely through the rear end of the upper conveyor board 6, this shaft being disposed on the stubble side of the space between the conveyor boards and in a position opposite the inclined shaft 13 before alluded to. The shaft 25 has fixed to it a sprocket wheel 28 around which passes a sprocket chain 29 which passes also around a sprocket wheel 30 on the lower end of the shaft 20, by which means the latter shaft is driven.

Near its upper end the shaft 25 has fixed to it closely adjacent the board 6, a feed wheel 25ª which is provided with retractable teeth 25ᵇ which act on the stalks and feed them rearwardly in the stalk passage and present them to the action of the binding mechanism presently to be described.

The space between the opposing conveyor boards as above described, constitutes an upright stalk passage, into the opposite sides of which the teeth of the opposing conveyor chains project and co-operate with each other in moving the cut stalks rearwardly in the passage in an upright position so that they may be presented to the action of an automatic binding mechanism A, the butt ends of the stalks resting on a pan 31 which constitutes the bottom of the stalk passage and which extends from a point immediately in rear of the cutting mechanism 4, rearwardly at an upward inclination between the shafts 13 and 25 and then laterally and stubblewardly and terminates at its discharge end at the stubble side of the machine. The sides of this pan are provided with upright edge flanges 31ª to prevent the lateral escapement of the stalk butts, and at its forward end the pan is formed with a flat portion or finger 31ᵇ possessing some degree of inherent flexibility. The finger is provided with longitudinal slots 31ᶜ which receive pins 31ᵈ depending from a flexible plate 32 fixed to the machine frame and immediately in rear of the cutting mechanism, each of said pins being provided on its lower end with a head bearing against the under side of the finger and acting to hold the parts together. As a result of this flexible construction of the forward end of the pan it may be raised and lowered in the stalk passage and is capable of a limited endwise motion, the purpose of which will presently appear.

At the rear part of the stalk passage there are provided opposing vertical plates constituting the walls of the passage, a plate 33 on the grain side of the passage and a plate 34 on the stubble side of the same, which plates are fixed at their lower ends to the respective lower conveyor boards and extend upwardly therefrom and terminate some distance below the upper conveyor boards. The plate 33 terminates at its rear some distance stubbleward of the shaft 13, and the plate 34 is curved at its rear end so as to extend laterally and in rear of the shaft 25. These plates thus disposed form the side walls of the lower portion of the stalk passage, the pan 30 forming the bottom of the passage and fitting slidably between the plates.

The operative parts so far described are driven from the bull or stubble wheel 2 by the driving mechanism shown in Fig. 4 where it will be seen that a transverse horizontal shaft 35 is mounted in bearings sustained by the machine frame in front of the bull wheel, which shaft has a sprocket wheel 36 fixed to it near its outer end and has two bevel gears 37 and 38 fixed to its inner end. A sprocket chain 39 passes around the sprocket wheel 36 and around a large sprocket wheel 40 fixed to the bull wheel, by which means the shaft 35 is rotated as the machine advances through the field. A transmitting shaft 41 is mounted at its front end in a bearing 42 on the main frame adjacent the inner end of shaft 35, and extends therefrom diagonally rearwardly and is mounted at its rear end in a bearing 43 on the main frame between the two inclined shafts 13 and 25. Near its forward end the shaft 41 has a bevel gear 44 fixed to it which meshes with the gear 38 on the shaft 35, and at its rear end the shaft 41 has fixed to it a bevel gear 45 which meshes with a bevel gear 46 on a horizontal transverse shaft 47 extending between the inclined shafts 13 and 25 and mounted in suitable bearings on the main frame.

At one end the shaft 47 carries a bevel gear 48 meshing with a bevel gear 49 on the shaft 13, and at its other end it carries a bevel gear 50 meshing with a bevel gear 51 on the shaft 25, whereby the rotary motion imparted to the shaft 35 from the bull wheel will be transmitted to the inclined shafts 13 and 25 through the medium of the transmitting shaft 41.

The cutting mechanism before alluded to also receives its motion from the shaft 35 by means of the bevel pinion 37 thereon, which meshes with a bevel pinion 52 on the forward end of a shaft 53 mounted in bearings on the main frame and carrying a crank disc 54 to which is connected a pitman 55 connected in turn with the reciprocating knife of the cutting mechanism.

The parts hereinbefore described may be of the customary construction now well known in this art and except in so far as certain of these parts are modified as will presently appear to co-operate with my improvements, they in themselves form no part of the present invention.

My invention is concerned mainly with the manner of adjustably sustaining the binding mechanism A to enable it to be adjusted up and down with reference to the stalk passage, and in accordance with my invention the binding mechanism is sustained on a transverse supporting bar 56 (Figs. 2, 6 and 7) arranged at the rear end of the machine, which bar is carried by two end members 57 and 58 mounted to move vertically in upright guide brackets 59 and 60 extending upwardly from the opposite sides of the main frame at its rear end, the two end members and their connecting bar 56 constituting in effect a slide, which when adjusted vertically by the adjustments of the end members will correspondingly adjust the binding mechanism as a whole, and through the medium of certain connections presently to be described also correspondingly moving the upper conveyor boards, their associated conveyor chains, and the divider boards sustained by the conveyor boards. To enable the conveyor boards and associated parts to be thus moved up and down, the forward ends of the conveyor boards and their associated divider boards are connected together as shown in Fig. 5 and pivoted to the diverging extensions 1$^a$ of the main frame on horizontal transverse axes 61 so that these parts may be moved up and down as a unit at their rear ends on said axes. The detailed form of these pivotal connections is shown in Fig. 5 where it will be seen that the forward end of each conveyor board has fixed to it a casting or bracket 62 to which is bolted a casting or block 63 to which the forward end of the divider board is firmly attached, the bracket 63 terminating in a divider point 63$^a$. The bracket 62 is provided with depending ears 62$^a$ embracing between them the forward extremity of the frame extension 1$^a$, the pivot pin 61 being extended through the ears and end of the extension and serving to connect the parts pivotally on a transverse axis. As a result of this construction, the two upper conveyor boards, and their associated conveying chains and the divider boards may be moved up and down as units at their rear ends relatively to the rear end of the machine, the parts pivoting at their forward ends on the pivots 61 and moving along the two inclined shafts 13 and 25 at their rear ends, the sprocket wheel 12 and the feeding wheel 25 in this action sliding along the shafts 13 and 25 respectively by reason of the splined connection of said wheels with the shafts as before described.

The operative parts of the binding mechanism A are mounted in and sustained by the usual U-shaped binder frame 63, which frame is arranged adjacent the discharge end of the stalk passage, one arm 64 of the frame extending in front of the passage and the other arm 65 in rear of the same, while the horizontal portion 66 connecting the lower ends of the two arms, extends beneath the bottom of the passage. This horizontal connecting portion 66 is formed with a transverse horizontal opening therethrough in which the vertically adjustable sustaining rod 56 before alluded to extends, and a bracket 67 is fixed to the lower end of the arm 65 and extends grainward therefrom and has fixed to it a rod 68 which extends forwardly and is mounted at its forward end on the rod 56 some distance stubbleward of the connecting portion 66, by which means the binding mechanism is sustained by and movable as a whole with the vertically adjustable sustaining bar 56. A vertical plate 69 is fixedly connected with the arm 65 of the U-shaped frame, and is curved so as to surround the outer rear side of the lateral portion of the stalk passage and forms in effect the rear outer wall of the passage at this point. The forward edge of this plate has fixed to it a vertical bar 70 (Figs. 2 and 6) which is extended upwardly and is bent outwardly at its upper end and firmly fastened to the under side of the upper conveyor board 6ª at its rear end, whereby in the up and down movements of the binding mechanism and the plate 69, the conveyor board will be moved with it. The U-shaped frame of the binding mechanism is connected with the outer conveyor board 6 to cause this board to move in unison with the board 6ª, by means of an arm 71 (Figs. 6 and 9) which is connected at its lower end with the forward arm 64 of the U-shaped frame, and at its upper end with the board 6. At its rear, the conveyor board 6ª on the grain side of the stalk passage, has a shield or plate 72 fastened to its under side at its inner edge, which plate extends downwardly along the inner side of the fixed plate 33 of the stalk passage. Likewise, a plate 73 is fixed to the rear portion of the conveyor board 6 at its inner edge and extends downwardly along the inner side of the fixed plate 34 of the stalk passage, so that in the vertical movements of the conveyor boards, when the binding mechanism is correspondingly adjusted, the depending plates 72 and 73 will slide along the fixed plates 33 and 34 and will form continuations of the same, and thereby preserve the continuity of the walls of the passage in the different adjustments of the binding mechanism.

The needle shaft 74 of the binding mechanism is mounted as usual in the tubular arm 65 of the U-shaped frame, and it carries the needle 74ª, while the knotter shaft 75 is mounted in the tubular arm 64 and operates the usual knotter mechanism 75ª, which two devices together with the other operative parts of the binding mechanism, such as the packer, the compressor and the ejector 75ᵇ, all operate in the stalk passage and are driven from a driving shaft 76, which is mounted at its upper end in a bracket 67ª extending grainward from the tubular arm 65, and at its lower end in the bracket 67 before alluded to. The driving shaft 76 is squared and slides through a squared hole in a sprocket wheel 77 by which the shaft is driven, which wheel is journaled in the upper end of an arm 77ª extending upwardly from the machine frame, whereby in the vertical adjustments of the binding mechanism, the squared driving shaft will move through the sprocket wheel and will be subject to the driving action of the wheel in the different positions of adjustment of the binding mechanism. This shaft as usual gives motion to the various operating parts of the binding mechanism, and in the present case it is driven from the inclined shaft 13 before alluded to, by means of a sprocket chain 78 which passes around a sprocket wheel 79 on said shaft and around a sprocket wheel 80 rotatably mounted on a laterally swinging plate 81 pivoted at its forward end as at 82 (Fig. 2) to an upwardly and forwardly inclined bar 83 fixed at its forward end to the main frame and supported at its rear end by the bracket 60 before alluded to. The sprocket wheel 80 has fixed to its upper side a companion sprocket 84, and a sprocket chain 85 passes around the sprocket 84 and also around the sprocket wheel 77 on the driving shaft 76, by which arrangement the rotary motion of the inclined shaft 13 will be imparted to the driving shaft 76 of the binding mechanism.

The binding mechanism, supported as hereinbefore described by the vertically movable slide, is adjusted up and down by the adjustments of the end members 57 and 58 in their vertical guide brackets 59 and 60. To effect these adjustments the end members are formed on their rear edges with racks 86 (Figs. 1, 2 and 8) which are engaged by pinions 87 and 88 on the opposite ends of a horizontal transverse shaft 89 mounted in bearings on the guide brackets near their lower ends and constituting a rotary device for adjusting the slide. At the stubble end of the shaft there is fixed to it at the outer side of the pinion 88, a worm wheel 90 which is engaged by a worm 91 on the rear end of a shaft 92, mounted at its rear end in bearings sustained by the guide bracket, and extending forwardly and upwardly within reach of the driver's seat, at which point the shaft is mounted in a bearing 93 on the upper end of an arm 93ª sustained by the main frame, the end of the shaft being provided with a crank 94 for operating it. By the rotation of this crank, the end members 57 and 58 will be fed up or down, as the case may be, in their guiding brackets in vertical lines and the binding mechanism as a unit correspondingly moved, together with the rear plate 69, the upper conveyor boards and conveyor chains and the plates 72 and 73 depending from said boards. This movement of the binding mechanism is in relation to the stalk passage, and its effect is to adjust the binding mechanism to different heights relative to the bottom of the passage, so that the point in the length of the bundle at which the binding twine is applied may be varied to accommodate stalks of different lengths.

It will be observed that the bottom of the rear portion of the stalk passage, the walls of the same and the frame members of the binding mechanism all incline forwardly from the vertical, and in the vertical adjustments of the binding mechanism by the hand crank 94, the binding mechanism and parts connected therewith move in an arc having the pivotal axes 61 as a center, and they rise from the position indicated by full lines in Fig. 3 to that shown by dotted lines in said figure. In this action, the squared driving shaft 76 and pinion thereon move in said arc slightly to the rear and thus tend to tighten the sprocket chain 85. To prevent this tightening of the chain and to maintain the same at a uniform tension under the conditions mentioned, I connect the free end of the pivoted plate 80 carrying the sprocket wheel 84, with the frame of the binding mechanism by means of a radius rod 95 (Figs. 2, 3 and 6) the outer end of which is pivoted to the free end of the pivotal plate on a horizontal transverse axis 96, and the inner end of which is pivoted on a parallel axis to the frame of the binding mechanism as at 97. The effect of this connection of the parts by the radius rod is to swing the plate on its axis and draw the sprocket wheel 84 toward the sprocket wheel 77 to the same extent that the wheel 77 is moved rearwardly when the binding mechanism is raised. As a result, a uniform distance is maintained between the two wheels and therefore the tension of the chain remains unchanged.

As the binding mechanism possesses considerable weight, it is desirable to counter-balance it, and this I effect in the present instance by the counter-balancing mechanism shown in Fig. 7, where it will be seen that the vertically movable supporting bar 56 which sustains the binding mechanism, has pivoted to it the rear end of a lever 98, the connection between the two being formed by a sleeve 98ª fixed to the lever and loosely encircling the rod. At its forward end the lever is pivoted to the main frame on a horizontal transverse axis as at 99, and between its ends the lever has connected with it the lower end of a strong coiled spring 100, the upper end of which is connected with an arch frame 101 extending upwardly from and supported by the main frame. The tendency of the spring is to pull up on the lever 98 and thereby exert a lifting and sustaining force on the binding mechanism, whereby it is counter-balanced and its movements eased.

The pan 31 constituting the bottom of the stalk passage and flexibly connected at its forward end to the machine frame as before described, is adjusted to different heights in the stalk passage as shown more particularly in Fig. 10, where it will be seen that the pan has fixed to its under side at its rear, the upper ends of two links 102, the lower ends of which are pivoted to crank arms 103 on a rock shaft 104 mounted in suitable bearings on the main frame, whereby in the rocking motions of the shaft, the links will be raised and lowered as the case may be, and will correspondingly adjust the pan. The rock shaft has a crank arm 105 fixed to its end, to which is pivoted one end of an actuating rod 106, the other end of which is pivoted to a hand lever 107 pivotally supported at its lower end on the main frame. The hand lever is provided with a latch device co-operating with a toothed segment bar 107ª pivoted to the frame, whereby the pan may be locked and held in the particular position to which it is adjusted.

By the vertical adjustments of the binding mechanism, with the bottom pan remaining at a constant level, I am enabled to accommodate bundles varying in length within certain limits, and can apply the binding twine thereto at the proper and effective point. This limit however, may be greatly increased by making use of the adjustable pan in connection with the adjustments of the binding mechanism, the pan being moved upwardly and the binding mechanism downwardly for extremely short bundles, and the pan being moved downwardly and the binding mechanism upwardly for extremely long bundles. As a further result of the co-operation with each other of the two adjustable devices, a greater range of lengths of bundles can be accommodated by a minimum movement of the comparatively heavy binding mechanism, than if dependence were placed on the adjustment of the binding mechanism alone.

It will be noted from the construction described that the adjustments of the binding mechanism and the bottom pan are effected independently of each other. I deem this feature of importance and advantage, in that I am enabled to employ either device singly without necessarily using the other, which might be desirable under certain conditions encountered in the field.

It is found in the practical use of the machine in the field that in a moist or muddy soil, the earth will adhere tenaciously to the rim of the bull wheel and will have the effect of increasing the diameter of the same. As the power for the operative mechanism of the machine, including the binding mechanism, is taken from this wheel as above explained this increased diameter causes a slower operation of the mechanism for a given distance of travel, than in the normal condition of the wheel, and to counteract this action, I provide means operable at will for driving the operative parts from the bull wheel at a higher speed than normal so that in the event of the accumulation of earth on the wheel, the speed imparted to the operative parts may be increased. This is effected in the present instance by a form of change-speed mechanism illustrated more particularly in Figs. 4 and 11. In these figures, it will be seen that the sprocket wheel 36 has fixed to its inner side a second larger sprocket wheel 108, both of which are rotated freely on the shaft and are capable of a limited sliding movement longitudinally thereon. The hub of wheel 36 is formed with clutch teeth 36ª adapted, when the wheels are moved to the right (Fig. 11) to engage a pin 109 carried by the shaft, so that in this position the shaft will be driven by the smaller wheel. The hub of wheel 108 is provided with clutch teeth 108ª adapted, when the wheels are shifted to the left to engage a pin 110 on the shaft and when so engaged, the shaft will be driven by the larger wheel. As a result, when the chain 39 is applied to the smaller sprocket, the operative parts of the machine will be driven at a higher speed, and when the chain is removed from the smaller wheel and applied to the larger one, the operative parts of the machine will be driven at a reduced speed. The purpose of providing for the shifting of the wheels along the shaft is to bring one or the other of the two wheels into alignment with the sprocket wheel 40 on the bull wheel, so that when the chain is applied to either of the wheels, the chain will extend in a straight path coincident with the planes of the driving and driven wheels. The sprocket wheels are shifted along the shaft to one position or another by means of an upright lever 111 which extends at its lower end through and is confined loosely in a slot in a bracket plate 112 fastened to the machine frame, so that the lever can be swung from side to side and can also be moved to a limited extent at right angles to its swinging movement. The lever carries a horizontal rearwardly projecting pin 113 which extends loosely through the lever and through an arcuate slot 114 in the bracket plate and is connected at its rear end with a horizontal U-shaped slide frame 115, the swinging movement of the lever thus causing the U-shaped slide frame to shift back and forth horizontally. The end limbs 115ª and 115ᵇ of the slide frame are formed with aligned holes which loosely surround a rod 116 mounted to slide endwise in guides in arms 117 and 118 fixed to the machine frame. The rod 116 is provided with two pins or stops 116ª and 116ᵇ disposed between the end limbs of the sliding frame and arranged a distance apart less than the distance between said limbs, so that the rod is capable of a limited endwise movement or play relative to the sliding frame, the purpose of which will presently appear. The rod 116 has fixed to it, the foward end of an arm 119 whose rear end is formed as at 120 to loosely embrace the hub of the sprocket wheel 108 in an annular groove therein. As a result of the construction described, when the hand lever is shifted to the left to the position shown in Fig. 11, the sliding frame 115 will be likewise shifted, and by the engagement of the end limbs thereon with the pins 116ª and 116ᵇ on the rod, the latter will be correspondingly moved and will shift arm 119 and thereby move the two sprocket wheels 36 and 108 to the left and engage the clutch teeth 108ª with the pin 110 on shaft 35. This is the position of the parts shown in Fig. 11. When now the hand lever is swung to the right to its other extreme, a reverse movement of the connected parts will take place, and the clutch teeth 36ª on wheel 36 will be engaged with the pin 109 on the shaft. With the hand lever in a medial position, both sprocket wheels will be disengaged from driving connection with the shaft, and will be rotated idly thereon without imparting motion to the shaft. The pin 113 before alluded to as carried by the hand lever and as being connected with the U-shaped sliding frame 115, is encircled by a spiral spring 120ª which bears at its inner end against the lever and at its outer end against a head 121 on the end of the pin. This construction permits the lever to be moved to and from the bracket plate 112 in order that a locking pin 122 fixed to the lever may be engaged in or disengaged from either of three holes 123, 124 and 125 in the bracket plate in order to hold the lever in either of the three positions above mentioned. With the locking pin engaged in hole 123, the sliding frame 115 will be held in a position where the clutch teeth of sprocket wheel 108 will be engaged with pin 110 on the shaft. With the locking pin in hole 125, the sliding frame will be held where the teeth of sprocket wheel 36 will be engaged with pin 109 on the shaft; and with the locking pin in the central hole 124, the sliding frame will be held with the sprockets in a medial position and neither engaged with the shaft.

In order that the clutch teeth of the two sprockets will be engaged with yielding pressure, I provide a spring 126 which is connected at its inner end with the shifting arm 119 and at its outer end with the outer end of a tumbler arm 127 whose inner end is pivoted as at 128 to a lug 129 extending upwardly from the bracket plate 112. The form and relation of these parts are such that when the tumbler arm is in the position shown in Fig. 11, the spring will be under tension and will exert a pull on the shifting arm 119 and will hold it yieldingly with the clutch teeth on wheel 108 engaged with the pin 110 on the shaft, the sliding frame 115 being held by the actuating lever with the two limbs of the frame free of the pins 116ª and 116ᵇ on rod 116. When the tumbler arm is thrown over to the opposite position and the actuating lever is shifted and locked in position with its locking pin engaging in hole 125, spring 126 will pull on the shifting arm and hold the clutch teeth 36ª of wheel 36 yieldingly engaged with pin 109 on the shaft, the sliding frame 115 being held as before with its end limbs disengaged from the pins on rod 116.

In the operation of the mechanism, when the parts are in the position as shown in Figs. 11 and 4, the rotation of the bull wheel will be transmitted to the operative parts of the machine through the smaller sprocket wheel 36 at increased speed, this wheel being employed when there is an accumulation of earth or mud on the bull wheel. In changing the speed to a slower rate for operation under normal conditions, the tumbler arm 127 is first swung over to the right (Fig. 11) thereby causing the spring to exert a pull on the shifting arm 119 in a direction to shift the sprocket wheels 108 and 36 to the right and engage the clutch teeth of wheel 36 with the pin 109 on the shaft, this action bringing the larger wheel into alignment with the sprocket wheel on the bull wheel, it being understood that previous to the change in the position of the tumbler arm, the chain 39 was removed from the smaller wheel. The attendant then disengages locking pin 122 on the hand lever from the hole in the bracket plate in which it was engaged, and the frame 115 being thus released, spring 126 will act to shift rod 116 to the right, the sliding frame being moved with it due to the engagement of pin 116ª with the limb 115ᵇ of the sliding frame, and since the sliding frame is connected with lever 111 by the pin 113, the actuating lever will be correspondingly moved, the attendant by retaining hold of the lever being able to control the movement of the same under the influence of spring 126. When the locking pin on the lever arrives in position opposite the hole 125, the lever is released by the attendant and spring 120ª acting on the lever, will cause the locking pin to enter the hole, and the lever will be locked in position. In this position of the lever, the sliding frame will be held in such position that the teeth on wheel 36 will be engaged with pin 109 on the shaft, which engagement is maintained by the spring 126, due to the fact that pin 116ª is out of engagement with the frame. The wheel 108 being now in alignment with the sprocket wheel on the bull wheel, the driving chain is applied to wheel 108, and the rotation of the bull wheel will be transmitted to the operative parts of the mechanism through wheel 108 at a reduced speed. When it is desired to prevent the operation of the shaft 35, and consequently the operation of the parts of the machine, the two sprocket wheels 108 and 36 are adjusted to a medial position out of engagement with both pins 109 and 110 on the shaft. This is effected by first swinging the tumbler arm to a vertical position and then releasing the actuating lever from its locked position to the right or left as the case may be, and adjusting it to a central position, and finally engaging the locking pin on the lever in the central hole 124 of the bracket plate.

In order that the driver may control the delivery of the bound bundles to the ground, I provide a bundle carrier of improved form and construction and consisting of a receptacle or pan 128 mounted on the stubble side of the main frame at the discharge end of the stalk passage and movable from a substantially horizontal position, in which position it will receive the bundles delivered by the binding mechanism, to a substantially vertical position to discharge the bundles to the ground, suitable controlling devices being provided which are connected with the receptacle and extended within reach of the driver's foot where they terminate in a foot lever, the said controlling devices being of such form and construction that by pressing down on the foot lever the driver may hold the pan in its horizontal receiving position until the desired number of bundles have been received, whereupon by letting up on the foot lever, the weight of the bundles will swing the pan down and the bundles will be discharged to the ground. This construction is shown more particularly in Figs. 1 and 12 where it will be seen that the pan has fixed to its under side at opposite ends, bearings 129 which encircle a supporting rod 130 fixedly mounted at its ends in brackets 131 sustained by the main frame of the machine, the pan being thus supported on an axis so that it may swing down from the substantially horizontal receiving position as shown by full lines in Fig. 12 to a substantially vertical position as shown by dotted lines in said figure. The supporting axis is disposed nearer to the inner edge of the pan than to its outer edge so that there will be a preponderance of weight supported outward of the axis to facilitate the down swing of the pan in the discharging operation. The controlling devices by which the driver is enabled to control the operation of the pan, comprise in the present instance a foot lever 132 having on its inner end a rock shaft 133 mounted in a bearing 134 on the machine frame, and having on its outer end a foot rest 135. The rock shaft has connected with it a crank arm 136 to which is pivoted the forward end of a link 137 whose rear end is pivoted to a crank arm 138 fixed to a rock shaft 139 mounted in bearings on the frame and having connected with it an arm 140. A chain 141 is connected with the end of the arm 140 and with the pan at its inner edge. The form, construction and relation of these parts is such that when the driver with his foot on the foot rest swings the foot lever 132 down to the position shown in Fig. 12, the pan will be held in a horizontal receiving position shown by full lines. In this position, the bundles are received from the binding mechanism, and when the required number has been accumulated for delivery to the ground, the driver lets up with his foot on the foot lever and the weight of the bundles will cause the pan to swing downwardly on its pivotal axis as shown by dotted lines, thereby delivering the bundles instantly and directly to the ground without undue shock or violence. After the discharge of the bundles, the driver again presses forwardly and downwardly on the foot lever and restores the pan to its former horizontal receiving position to receive another load. It will be observed that when the carrier is held in its receiving position by the depression of the foot lever, the link 137 will extend alongside the crank arm 136 in substantial alignment with the same. This reduces the leverage on the foot lever to a minimum and enables the driver by a slight pressure on the foot lever to readily hold the weighted carrier until ready to discharge the bundles.

The ejector $75^b$ shown more particularly in Figs. 1 and 13 operates through a slot $73^a$ in the plate 72 and it acts to eject the bound bundle 142 from the stalk passage. The ejector is pivoted as at $75^c$ to the outer end of an actuating arm $75^d$ fixed to and rotatable with the knotter shaft 75, and at its inner end it is provided with a finger $75^e$ carrying a roller $75^f$ which travels in a cam groove $75^g$ in a fixed cam plate $75^h$ sustained by the tubular arm 64 of the binder frame. The cam groove is of such contour that the ejector as it approaches the bundle from the rear, will be projected outwardly and rocked on its pivotal axis $75^c$ and will be caused to sweep forwardly with a quick ejecting motion, due to the sharp turn which the cam groove makes where it extends outwardly from the inwardly grooved position $75^i$. As a result the bundle will be positively ejected with a quick forceful motion and by its momentum will be caused to leave the stalk passage with celerity and certainty.

Due to the proximity of the ejector to the bull wheel, more particularly when the binding mechanism is adjusted to its lower position, if the ejector swings around in extended relation to the actuating arm as shown by full lines (Fig. 13), it will engage with the bull wheel, and to prevent this interference, I provide a stop device or pin $75^k$ which extends upwardly from the cam plate and in the path of the ejector, the engagement of the ejector with the pin, as the actuating arm swings past the bull wheel, causing the ejector to swing inwardly on the pivotal axis as shown by the dotted lines to the left in Fig. 13, and enabling it to pass the bull wheel without interference therewith.

In the foregoing description and accompanying drawings I have set forth my invention in the particular detailed form which I prefer to adopt and which in practice has been found to answer to a satisfactory degree the ends to be attained. It will be manifest however that various changes may be made in the parts without departing from the limits of my invention; and it will be understood that the invention is not limited to any particular form or construction of the parts, except in so far as such limitations are specified in the claims.

Having thus described my invention, what I claim is:

1. In a corn harvester, the combination of a main frame provided with a stalk passage in which the stalks are conveyed in an upright position, a bottom for said passage to support the butts of the stalks, means for adjusting said bottom relative to the passage in the direction of the length of the stalks, an automatic binding mechanism sustained by the main frame in position to act on the stalks in the passage, and means independent of the bottom adjusting means for adjusting the binding mechanism relative to the passage in a direction lengthwise of the stalks.

2. In a corn harvester, the combination of a main frame provided with a stalk passage in which the stalks are conveyed in an upright position, a cutting mechanism for severing the standing stalks, a bottom for said passage to support the butts of the cut stalks, the forward end of said bottom being provided with a resilient portion connected with the main frame in rear of the cutting mechanism to enable the bottom to be adjusted up and down, and means connected with the bottom for adjusting it up and down.

3. A corn harvester having a main frame provided with a stalk passage in which the stalks are conveyed in an upright position, a bottom for said passage to support the butts of the stalks, means for adjusting said bottom relative to the passage in the direction of the length of the stalks, automatic binding mechanism sustained by the main frame in position to act on the stalks in the passage, and means for adjusting the binding mechanism relative to the stalk passage in the direction of the length of the stalks whereby both the binding mechanism and the bottom of the stalk passage may be adjusted to adapt the machine to efficiently handle stalks of different lengths.

4. In a corn harvester, the combination of a main frame provided with a stalk passage in which the stalks are conveyed in an upright position, a cutting mechanism for severing the standing stalks, a bottom for the stalk passage to support the butts of the stalks, said bottom being formed with a resilient portion connected with the main frame in rear of the cutting mechanism to permit the bottom to be adjusted up and down, and said bottom being movable to a limited extent endwise relative to the passage, and means connected with the bottom for adjusting it up and down lengthwise of the stalks.

5. In a corn harvester, the combination of a main frame provided with a stalk passage in which the stalks are adapted to be conveyed in an upright position, conveying mechanism associated with said passage and adapted to act on the stalks and convey them rearwardly therein, said conveying mechanism being movable relative to the passage lengthwise of the stalks, an automatic binding mechanism sustained by the main frame for binding the stalks into bundles and adjustable relative to the stalk passage lengthwise of the stalks, means for adjusting the binding mechanism, and connections between the binding mechanism and conveying mechanism to cause the latter to be adjusted with the former.

6. In a corn harvester, the combination of a main frame provided with a stalk passage, conveyor boards and associated conveyor chains on opposite sides of said passage by which the stalks are conveyed rearwardly in the passage in an upright position, said boards and chains being movable up and down relative to the passage lengthwise of the stalks, a binder frame sustained by the main frame, and an automatic binding mechanism mounted in the binder frame for binding the stalks into bundles, said binder frame being adjustable relative to the stalk passage lengthwise of the stalks, and being connected with the conveyor boards to cause them to be adjusted with the binder frame.

7. In a corn harvester, the combination of a main frame provided with a stalk passage in which the stalks are conveyed in an upright position, a conveyor board on each side of the passage, a conveyor chain associated with each board, said boards and chains being movable relatively to the passage in the direction of the length of the stalks, a binder frame sustained by the main frame, means for adjusting the binder frame relative to the passage lengthwise of the stalks, automatic binding mechanism mounted in the binder frame, and members connecting said binder frame with the respective conveyor boards to cause the latter to be adjusted with the binder frame.

8. In a corn harvester, the combination of a main frame provided with a stalk passage in which the stalks are conveyed in an upright position, conveyor boards pivoted at their forward ends to the main frame at the forward end of the stalk passage to move up and down relative thereto and extending on opposite sides of the passage, conveying devices associated with the boards and adapted to act on the stalks and convey them rearwardly in said passage, and means for adjusting said boards and conveying devices relatively to the passage lengthwise of the stalks.

9. In a corn harvester, the combination of a main frame provided with a stalk passage to receive the stalks in an upright position, and forward extensions on the main frame at the forward end of said passage, conveyor boards at the sides of the passage pivoted at their forward ends to said extensions so as to move up and down lengthwise of the stalks, conveying devices associated with the conveyor boards and supported thereby, and means for adjusting said conveyor boards up and down lengthwise of the stalks.

10. In a corn harvester, the combination of a main frame provided with a stalk passage in which the stalks are conveyed in an upright position, conveyor boards at the opposite sides of said passage mounted on the main frame to move up and down lengthwise of the stalks, upright shafts sustained by the main frame and extending loosely through said boards respectively, means for driving said shafts, sprocket wheels splined to the shafts to move up and down with the boards relatively to the shafts, conveyor chains passing around said sprockets at one end, guide wheels sustained by the boards and around which the conveyor chains pass at their opposite ends, and means for adjusting the boards up and down.

11. In a corn harvester, the combination of a main frame provided with a stalk passage and with forward extensions constituting the entrance to said passage, conveyor boards extending at the opposite sides of the passage and pivoted at their forward ends to said forward extensions, blocks fixed to the forward ends of the conveyor boards and terminating in divider points, divider boards sustained by the conveyor boards above the same and fixed at their forward ends to the divider points, whereby the conveyor boards and divider boards may be moved up and down relative to the stalk passage lengthwise of the stalks, and conveying devices sustained by the conveyor boards and movable up and down with them.

12. In a corn harvester, the combination of a main frame provided with a stalk passage in which the stalks are conveyed in an upright position, said frame formed with an upright guideway at the rear end of the stalk passage, a slide movable in said guideway and formed with rack teeth, a binder frame sustained by the slide, automatic binding mechanism mounted in the binder frame and adapted to act on the stalks and bind them into bundles, an operating member for the slide, and a pinion thereon meshing with the rack; whereby by the actuation of the operating member, the binding mechanism may be adjusted relative to the stalk passage lengthwise of the stalks.

13. In a corn harvester, the combination of a main frame provided with a stalk passage in which the stalks are conveyed in an upright position, conveyor boards extending on opposite sides of the stalk passage and mounted on the frame to move up and down relatively thereto, conveyor chains associated with the boards and movable up and down with them, a U-shaped binder frame sustained by the main frame at the rear portion of the stalk passage, means for adjusting the binder frame up and down lengthwise of the stalks, an automatic binding mechanism mounted in the binder frame, a member connecting one of the arms of the binder frame with one of the conveyor boards, and a second member connecting the other arm of the binder frame with the other conveyor board; whereby in the adjustment of the binder frame, the conveyor boards will be adjusted with it.

14. In a corn harvester, the combination of a main frame provided with a stalk passage in which the stalks are conveyed in an upright position, a slide mounted in the main frame to move up and down and comprising end members and a cross connecting bar, means for adjusting the slide up and down, a binder frame sustained by said cross bar, and automatic binding mechanism mounted in the binder frame to act on the stalks.

15. In a corn harvester, the combination of a main frame provided with a stalk passage in which the stalks are conveyed in an upright position, a slide mounted in the main frame to move up and down and comprising end members provided with racks and a cross bar connecting said end members together, a binder frame sustained by the cross bar, automatic binding mechanism mounted in the binder frame to act on the stalks, a rotary shaft mounted on the main frame, and pinions on the shaft meshing with the racks on the end members.

16. In a corn harvester, the combination of a main frame provided with a stalk passage in which the stalks are conveyed in an upright position, lower conveyor boards extending on opposite sides of the passage and fixed on the main frame, lower conveyor chains associated with said bars, plates fixed to said boards and extending upwardly at the opposite sides of the stalk passage, upper conveyor boards extending on opposite sides of the stalk passage above the lower boards and movable up and down relative to the lower boards, upper conveyor chains associated with the said upper conveyor boards and movable with them, plates depending from the upper conveyor boards and extending alongside the plates on the lower boards, and means for adjusting the upper boards up and down lengthwise of the stalks.

17. In a corn harvester, the combination of a main frame provided with a stalk passage in which the stalks are conveyed in an upright position, a binder frame mounted in the main frame for adjustment up and down and having automatic binding mechanism mounted in it to act on the stalks, means for adjusting the binder frame up and down lengthwise of the stalks, and a counter-balancing means for the binder mechanism sustained by the main frame and operatively connected with the binder frame.

18. In a corn harvester, the combination of a main frame provided with a stalk passage in which the stalks are conveyed in an upright position, a slide mounted for adjustment up and down in the main frame lengthwise of the stalks, a binder frame carried by the slide and provided with automatic binding mechanism to act on the stalks, means for adjusting the binder frame, a fore and aft extending lever pivoted at one end to the main frame and connected with the slide, and a counter-balancing spring connected at its upper end with the main frame and connected at its lower end with said lever.

19. In a corn harvester, the combination of a main frame provided with a stalk passage in which the stalks are conveyed in an upright position, a slide adjustable up and down in the main frame and including a sustaining cross bar, a binder frame sustained by the cross bar and provided with automatic binding mechanism to act on the stalks in the passage, means for adjusting the slide up and down, a fore and aft extending lever pivoted at its one end to the main frame and connected at its opposite end to the cross bar, an arch frame sustained by the main frame and extending above the lever, and a counterbalancing spring connecting at its upper end to the arch frame and at its lower end to the lever.

20. In a corn harvester, the combination of a main frame provided with a stalk passage in which the stalks are conveyed in an upright position, a binder frame mounted in the main frame and adjustable up and down lengthwise of the stalks about an axis situated in advance of the binder frame, means for adjusting the binder frame, automatic binding mechanism mounted in the binder frame to act on the stalks, said mechanism including an upright driving shaft, a drive sprocket wheel splined to the driving shaft, a support for said drive wheel formed to permit the wheel to move to a limited extent back and forth in the up and down movements of the binder frame but restraining it against movement lengthwise of the driving shaft, a supporting member mounted on the main frame and shiftable to and from the drive sprocket, a sprocket wheel journalled on the supporting member and shiftable with it, a sprocket chain passing around said sprocket wheels, means for driving the shiftable sprocket wheel, and a member pivotally connecting the binder frame with said supporting member and acting in the different adjusted positions of the binder frame, to preserve a uniform distance between the two sprocket wheels and a uniform tension on the sprocket chains.

In testimony whereof, I have affixed my signature hereto.

HENRY J. CASE.